United States Patent [19]

Vrijkorte

[11] Patent Number: 4,943,803

[45] Date of Patent: Jul. 24, 1990

[54] PAGING SYSTEM WITH PAGING RECEIVERS CONTROLLED DEPENDING ON LOCATION

[75] Inventor: Marcel J. G. Vrijkorte, Emmen, Netherlands

[73] Assignee: Ericsson Paging Systems B.V., Emmen, Netherlands

[21] Appl. No.: 277,879

[22] Filed: Nov. 30, 1988

[30] Foreign Application Priority Data

Dec. 1, 1987 [NL] Netherlands ........................ 8702885

[51] Int. Cl.[5] ........................ H04Q 7/00; H04B 7/00

[52] U.S. Cl. ........................ 340/825.490; 340/311.1; 340/825.44; 455/55

[58] Field of Search ........... 340/311.1, 825.46, 825.44, 340/825.47, 825.48, 825.54, 825.49, 825.55; 455/55, 57, 60, 110, 140, 228; 375/52

[56] References Cited

U.S. PATENT DOCUMENTS 4,639,726 1/1987 Ichikawa et al. .............. 340/825.44
4,714,925 12/1987 Bartlett ........................... 340/825.54
4,794,621 12/1988 Dirr ..................................... 455/110

*Primary Examiner*—Donald J. Yusko

*Assistant Examiner*—Dervis Magistre

*Attorney, Agent, or Firm*—Burns, Doane, Swecker & Mathis

[57] ABSTRACT

Paging system comprising a call transmitter, at least one portable paging receiver and a control transmission system with a control transmitter to which a number of transmission loops are connected encompassing essentially adjacent zones. The call transmitter is capable of transmitting a call transmission signal comprising a call address code. On receipt of a cell address code which corresponds to a call address code stored in the paging receiver, the receiver can generate a signal for the user of the receiver by means of a signalling member. The control transmission system is capable of transmitting by means of the loops a control transmission signal comprising a control command. On receipt of a control command by the receiver, the receiver can go into and remain in a state corresponding to the control command, in particular on or off. A control part of the receiver preferably puts the receiver into a predetermined state, in particular if the receiver has not received a control command, in particular an "on" command, for a predetermined period to time.

8 Claims, 1 Drawing Sheet

PAGING SYSTEM WITH PAGING RECEIVERS CONTROLLED DEPENDING ON LOCATION

DESCRIPTION OF THE INVENTION

The invention relates to a paging system comprising a call transmitter for transmitting a call transmission signal modulated in accordance with a call address code to be selected, and at least one portable paging receiver with a call receiving part for receiving the call transmission signal and for separating from it the call address code transmitted therewith, a memory for the storage of a call address code allocated to the receiver, a comparator for comparison of the call address codes received and allocated, and a signalling member for generating a signal for a user of the paging receiver depending on the result of the comparison.

Such a paging system is known from Dutch Patent Application No. 80.00578, which corresponds to U.S. Pat. No. 4,422,071.

It may be desirable at certain times and in certain areas, for example conference rooms, to prevent the generation of a signal by a signalling member of a paging receiver carried by a user. In a paging receiver of the known system this is possible only by switching off the signalling member through a deliberate action of the user. The user will generally have to do this after receiving a written or verbal instruction to that effect. The disadvantage of this is that, despite receiving the instruction, the user may forget to turn off his paging receiver or deliberately does not turn it off, something which can lead to annoying signalling for others.

Besides, when switching on is permitted again, the user may forget to switch on his paging receiver, so that he remains uncallable.

The object of the invention is to eliminate the disadvantages of the known paging system.

This object is achieved for a paging system of said known type according to the invention by a control transmission system which has a number of transmission loops encompassing essentially adjacent zones for the transmission of control transmission signals which have the same carrier wave frequencies, and which are angle modulated in accordance with control commands selected for the transmission loops, and in that a paging receiver has a control part for receiving a control transmission signal, for separating from the control transmission signal received the control command transmitted therewith, and for and maintaining the paging receiver in a certain state depending on the control command which has been separated off.

This means that when the user enters a particular zone his paging receiver may be put into a particular state which can relate to the individual or groupwise switching on or off of signalling members of the paging receiver and/or enabling a group of one or more paging address codes and/or control address codes which are stored in the paging system and which can be used for selective control of a number of paging receivers. By use of angle modulation, a paging receiver can separate the strongest control transmission signal from a number of simultaneously transmitted control transmission signals, and the paging receiver can separate the appropriate control command from the strongest received control transmission signal with relatively little chance of error. This means that the transmission loops can be disposed very close to each other, so that very accurately defined zones can be determined for receiving and processing therein only the control commands transmitted within the respective zones.

According to a preferred embodiment, the control part comprises a monostable multivibrator for putting the paging receiver into a predetermined state if no control command is received by the paging receiver during a period determined by the monostable multivibrator. In this way it is ensured that if the receiver misses a new control command intended for the receiver, for example due to interference, the receiver does not remain in a state which is determined by the control command last received and processed by the paging receiver.

The invention is explained below with reference to the drawing of an embodiment of a paging system according to the invention given by way of example. In the drawing.

Figure 1:
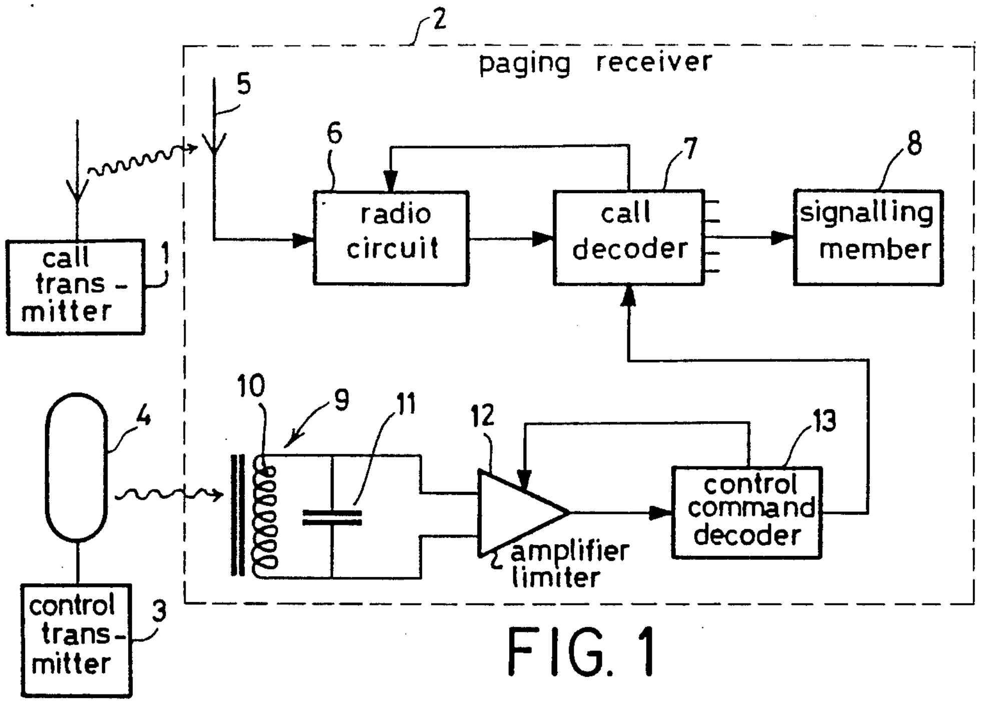
FIG. 1 shows schematically a paging system according to the invention.

The paging system according to the invention shown in FIG. 1 comprises a call transmitter 1, at least one paging receiver indicated by a dashed line block 2, and a control transmission system with a control transmitter 3 and a number of transmission loops connected to the control transmitter 3, such as transmission loop 4. A paging receiver 2 comprises a call part for paging in a manner which is known per se a user carrying the receiver 2, and a control part which can turn the call part into in particular two different positions: on or off.

The call part is equipped for receiving a call transmission signal transmitted by the call transmitter 1, at a carrier wave frequency of, for example, 40 MHz, which is frequency-modulated in accordance with a call message.

The call part of the paging receiver 2 comprises in series a high-frequency aerial 5, a radio circuit 6, a decoder 7, and one or more signalling members 8, which, on receipt of a call destined for the paging receiver 2, can produce an acoustic, optical or perceptible signal which is discernible by the user and possibly his environment. The receiver 2 also has switching means (not shown) for control of the receiver 2, for example for enabling a signalling member 8. The radio circuit 6 has a control input for receiving from the decoder 7 a control signal which is generated if no call transmission signal destined for the receiver 2 is received during a predetermined period, and which is equipped to turn the call part of the receiver 2 into a ready-to-receive state with reduced energy consumption.

The radio circuit 6 comprises a mixer circuit which takes a call transmission signal to a frequency range with a certain intermediate frequency and delivers it to the decoder 7. The decoder 7 demodulates the intermediate frequency signal and detects the call message transmitted by means of the call transmission signal and, if the call message has a call address code which is allocated to the receiver 2 and is stored in a memory of the receiver 2, the decoder 7 controls the signalling member 8 in accordance with the message.

The control part of the paging receiver 2 comprises in series a tuned aerial 9, which essentially comprises a parallel circuit of a coil 10 and a capacitor 11, an amplifier/limiter 12 and a decoder 13. The decoder 13 can be of the same design as the decoder 7.

The tuned aerial 9 is equipped for receiving a control transmission signal transmitted via a transmitter loop such as transmission loop 4 by the control transmitter 3 with, for example, a carrier wave frequency of 40 kHz which is frequency-modulated in accordance with a control command.

The control transmission signal received by the aerial 9 is amplified by the amplifier 12 and delivered at a limited amplitude to the decoder 13 which demodulates the signal and detects the control command transmitted by the control transmission signal. If the control part has not received a control transmission signal of a particular strength for a predetermined period of time, the decoder 13 generates a control signal which is capable of putting the control part into a ready-to-receive state with reduced energy consumption.

When the control part receives a control transmission signal modulated in accordance with an "off" command, the decoder 13 will control the decoder 7 of the call part in such a way that the call part is inhibited for generation of a signal by the signalling member 8. The call part is preferably switched into the low current consumption state then. The "off" position of the paging receiver 2 is maintained until the control part receives a control transmission signal modulated in accordance with an "on" command, or if no "off" command is received for a period predetermined by a monostable multivibrator of the decoder 13, for example 70 seconds. In this way, a specific state of the receiver 2 is certain to be obtained, for example, on leaving a zone belonging to a particular transmission loop. Besides, it means that the control transmission system need not transmit constantly, at least not the same signals all the time, so that various control commands can be transmitted at different times by means of each transmission loop and/or a saving can be made in the energy consumed by the transmitter 3.

The decoder 13 has a memory for storage of one or more control address codes allocated to one or more paging receivers. The decoder 13 also has a comparator for comparing a control address code transmitted by means of a control transmission signal received in addition to the control command with the control address codes stored in the memory of the decoder 13, and for having the control command processed by the paging receiver 2 in the event of their being found the same. In this way the paging receivers of a paging system can be controlled "on" or "off" selectively, individually or per group. A control address code may in this case have one or more arbitrarily valuable parameters (known in English literature as "don't cares"). This means that the receivers with a relatively small control address code memory can be divided into a number of groups which can have different receivers in common. Finally, through use of the monostable multivibrator in a zone encompassed by a transmission loop, different groups of paging receivers can be controlled all the time by transmitting various control transmission signals through the transmission loop.

The control address codes can be entered from the outside, for example via a loading rack for the receivers, in the memory of the decoder 13, for example in the manner disclosed in Dutch Patent Application No. 80.00578, which corresponds to U.S. Pat. No. 4,422,071.

Figure 2:
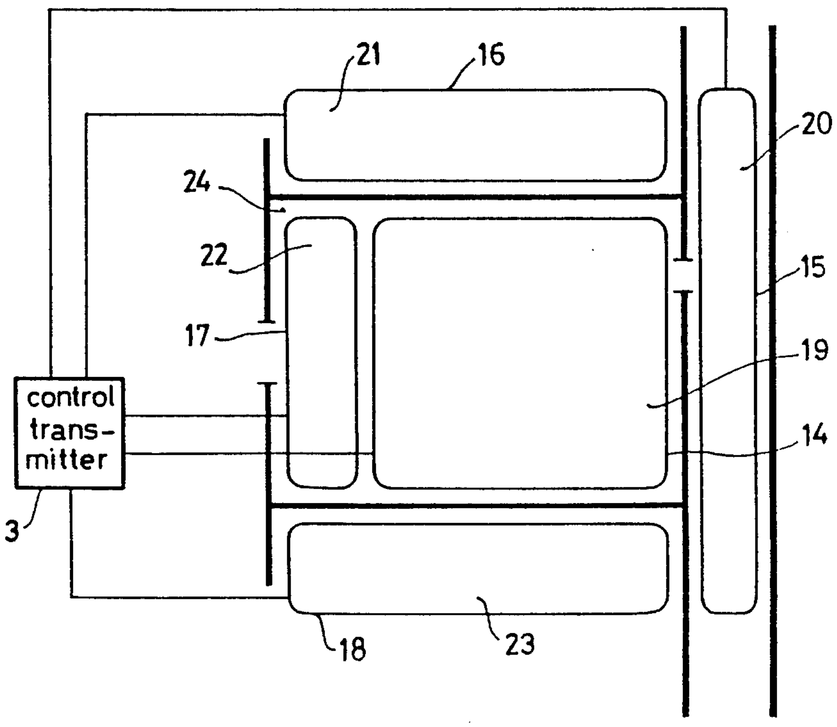
FIG. 2 shows schematically an example of a control transmission system of the paging system according to the invention of FIG. 1.

FIG. 2 shows schematically an example of the control transmission system of a paging system according to the invention which has a number of transmission loops 14, 15, 16, 17 an 18 connected to a control transmitter 3.

The thick lines in FIG. 2 represent partitions of rooms. The thin circumferential lines represent the control transmission loops 14, 15, 16, 17 and 18 encompassing zones 19, 20, 21, 22 and 23 respectively. A room 24, for example a conference room with an area where no interfering signals from paging receivers may be discerned, at least by a number of users of paging receivers, is provided with a transmission loop 14 which constantly transmits a control transmission signal modulated in accordance with an "off" command. The other transmission loops 15, 16, 17 and 18 constantly transmit a control transmission signal modulated in accordance with an "on" command. All control transmission signals transmitted by the transmission loops 14, 15, 16, 17 and 18 have the same carrier wave frequency.

The current intensities in the various transmission loops 14, 15, 16, 17 and 18 are set in such a way that the strengths of field of the control transmission signals of two adjacent transmission loops are approximately the same in the boundary region of the loops, and each control transmission signal is strong enough to be received in the zone belonging to the loop by a paging receiver 2 with the lowest sensitivity. Through the use of angle modulation-frequency modulation in the example illustrated - of the control transmission signal, sharply defined zones for switching on and switching off the paging receivers can thereby be obtained. The place where the paging receivers switch over is independent here of the sensitivity of the paging receivers then also.

When a user carrying a paging receiver 2 leaves the zone 19 encompassed by the transmission loop 14 he will pass into a zone 20, 21, 22 or 23 encompassed by one of the transmission loops 14, 15, 16, 17 an 18, so that his receiver receives a control transmission signal modulated in accordance with an "on" command, so that the receiver 2 is returned to a state where it can receive a call transmission signal intended for the receiver 2 and can generate the signalling for the user depending on said signal. If, however, on passing one of the loops 15, 16, 17 and 18 the receiver 2 "misses" the control transmission signal transmitted by these loops 15, 16, 17 and 18, for example because there is interference which means that a code corresponding to the "on" command is not properly detected by the decoder 13, the receiver 2 will still be switched to the "on" state after the period, for example 70 seconds, determined by the monostable multivibrator of the decoder 13. This prevents the receiver 2 from unwantedly remaining switched off for longer than this period due to interference outside the zone 19 encompassed by the transmission loop 14.

It is noted that various types of commands can be used according to the invention, for example for selectively switching on or off various signalling members 8 depending on a command received by a paging receiver 2.

It is also noted that the transmission loops 14, 15, 16, 17 and 18 can be connected to individual control transmitters which can be provided locally.

What is claimed is:

1. A paging system comprising a call transmitter for transmitting a call transmission signal modulated in accordance with a selectable address code, and at least one portable paging receiver with a call receiving part for receiving the call transmission signal and for separating from it the call address code transmitted therewith, a memory for the storage of a call address code allocated to the receiver, a comparator for comparison of the call address codes received and allocated, and a signalling member for generating a signal for a user of the paging receiver depending on the result of the comparison, comprising a control transmission system which has a number of transmission loops encompassing essentially adjacent zones for the transmission of control transmission signals which have the same carrier wave frequencies, and which are angle modulated in accordance with control commands selected for the transmission loops, and in that a paging receiver has a control part for receiving a control transmission signal, for separating from the control transmission signal received the control command transmitted therewith, and for putting and maintaining the paging receiver in a certain state depending on the control command which has been separated from the control transmission signal.

2. A paging system according to claim 1, whereby the states of the paging receiver corresponding to the various control commands correspond to whether or not signalling members of the paging receiver are enabled.

3. A paging system according to claim 1, whereby the control part implements a time-out function for taking the paging receiver into a predetermined state if no control command has been received by the paging receiver during a time-out period.

4. A paging system according to claim 1, whereby a control transmission signal has a control address code and the control part has a memory for storage of a control address code allocated to the receiver and a comparator for comparing the received and the allocated control address codes, for switching the paging receiver into the state corresponding to the control command received depending on the result of the comparison.

5. A paging system according to claim 4, whereby a control address code has one or more don't-care conditions.

6. A paging system according to claim 1, whereby a transmission loop for transmitting a control signal with a control command of a first type is surrounded by one or more transmission loops for transmitting a control signal with a control command of a second type.

7. A paging system according to claim 1, whereby the control commands comprise two commands for switching on or switching off the paging receiver.

8. A paging system according to claim 1, whereby on receipt of a control command intended for switching off the paging receiver the control part puts the paging receiver into a ready-to-receive state with reduced energy consumption.

* * * * *